No. 795,715. PATENTED JULY 25, 1905.
H. M. LOFTON.
THROTTLE VALVE.
APPLICATION FILED OCT. 29, 1904.

WITNESSES:
Jos. A. Ryan
Perry B. Turpen

INVENTOR
Herbert M. Lofton.
BY Munn & Co.
ATTORNEYS

UNITED STATES PATENT OFFICE.

HERBERT M. LOFTON, OF ATLANTA, GEORGIA, ASSIGNOR TO NATIONAL INVESTMENT COMPANY, OF SAVANNAH, GEORGIA, A CORPORATION OF GEORGIA.

THROTTLE-VALVE.

No. 795,715. Specification of Letters Patent. Patented July 25, 1905.

Application filed October 29, 1904. Serial No. 230,505.

*To all whom it may concern:*

Be it known that I, HERBERT M. LOFTON, a citizen of the United States, and a resident of Atlanta, in the county of Fulton and State of Georgia, have made certain new and useful Improvements in Throttle-Valves, of which the following is a specification.

My invention is an improvement in valves, and particularly in throttle-valves, and has for an object to provide a novel construction whereby a portion of the fed steam or other power fluid may be admitted to a desired point in advance of the passage of the main supply of such power fluid to its point of operation; and the invention consists in certain novel constructions and combinations of parts, as will be hereinafter described and claimed.

Figure 1:
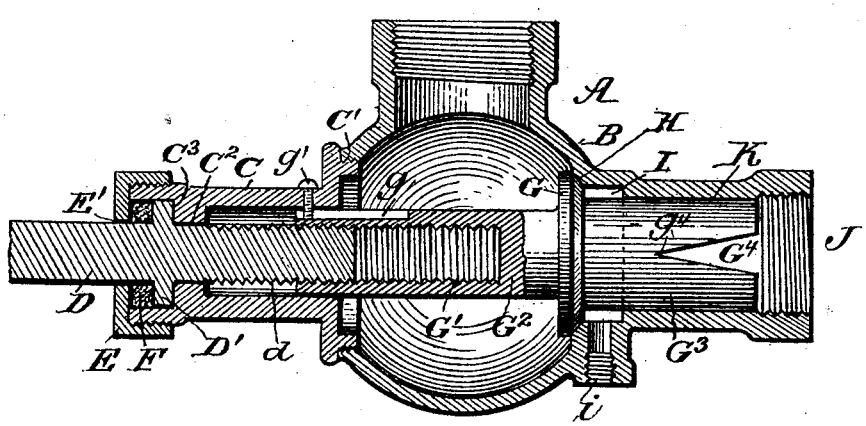
Figure 2:
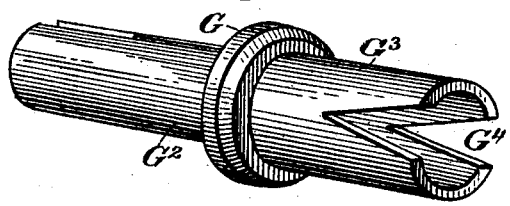

In the drawings, Figure 1 is a vertical longitudinal section of a valve embodying my invention, and Fig. 2 is a detail perspective view of the valve proper.

The casing A is preferably constructed, as shown, with a body B and a tubular extension C, connected by threading at C′ with the body B and forming a way for the operating-shaft D. This extension C is provided near its outer end with an opening at $C^2$, in which the shaft D turns, and with an outwardly-facing shoulder $C^3$, against which rests the flange D′ on the shaft D in the use of the invention. A cap E is threaded on the outer end of the tubular extension C, encircles the shaft D at E′, and operates to compress the gasket F against the outer side of the flange D′ of the operating-shaft D, said gasket F fitting within the outer end of the tubular extension C of the valve-casing A and being of any suitable compressible packing material. In practice I find vulcanized asbestos desirable and prefer to employ such material for the purpose. By this construction it will be noticed I securely pack the operating-shaft and prevent any escape of steam around the same.

The operating-shaft D is threaded at $d$ at its inner end and turns at such end in the threaded bore G′ of the stem $G^2$ of the valve G, whereby to operate the said valve to and from its seat in the use of the invention, a screw $g'$ or other suitable projection on the casing entering a keyway $g$ in the valve-stem G and preventing the same from turning without interfering with its longitudinal movement in setting the valve G to and from its seat.

The valve-casing A is provided at H with a valve-seat for the valve G and with an annular recess I concentric with said seat and forming a chamber from which leads a branch outlet $i$, the main outlet J for the steam being at the outer end of a cylindrical portion K of the casing, which cylindrical portion communicates at its inner end with the chamber I, is of less diameter than the chamber I, and extends outwardly to the main outlet J, where connection may be made in any suitable way with the part to which it is desired to supply steam. This cylindrical portion K is of less diameter than the chamber I, and the valve G is provided on its discharge side with a cylindrical portion $G^3$, which fits the cylinder K and is provided with a port or ports $G^4$, which terminate at their inner ends $g^4$ at points within the cylinder K or out of register with the chamber I when the valve is closed and during the initial opening movement of the valve, so that the valve may be opened to permit the passage of the steam to the chamber I and thence out of the outlet branch $i$ without permitting the passage of steam to the main outlet J. By this means steam may be permitted to pass from the branch outlet in advance of passing to the main outlet, so that the supply of steam may be permitted to pass, for instance, to the inner ends of the blades of rotary engines when it is desired to press such blades outwardly in advance of permitting the passage of steam to drive the engine. By preference the ports $G^4$ taper from their inner toward their outer ends, gradually widening toward their outer ends, so the valve may be operated to permit the passage of steam to a greater or less extent, as may be desired, in the operation of the engine.

The construction is simple, easily operated, and will be found to effectively serve the purpose for which it is designed.

Another advantage of this construction is that by graduating the amount of steam passing through the V-shaped ports mentioned the main-valve seats are not cut by what is known as "wire-drawn steam," as is the case where an ordinary disk valve is employed to regulate the amount of steam fed.

Having thus described my invention, what I claim as new, and desire to secure by Letters Patent, is—

1. The improvement in valves herein described comprising the casing having a body portion provided with a valve-seat, with a recess forming a chamber at the outer side of said seat, with a branch outlet leading from said chamber and with a main outlet and a cylindrical portion between said main outlet and chamber and provided opposite said valve-seat with a tubular extension threaded in connection with the body portion of the casing and provided near its outer end with an opening for the main shaft and outside said opening with an outwardly-facing shoulder, the main shaft having a threaded inner end and provided with an annular flange fitting against the outwardly-facing shoulder of the tubular extension, the packing-gasket against the outer side of said flange and the cap threaded on the outer end of the tubular extension and compressing the packing-gasket, the valve fitted to the seat of the casing and provided on its inner side with a stem keyed to and movable longitudinally within the tubular extension of the casing and threaded internally to receive the threaded end of the operating-shaft, said valve being provided on its outer side with a cylindrical portion fitting the cylindrical portion lying between the main outlet and the chamber of the casing and provided in said cylindrical portion with an outlet port or ports which terminate in the initial opening movement of the valve at a point clear of said annular chamber, whereby the branch outlet will be supplied with steam or power in advance of the main outlet substantially as set forth.

2. The improvement in valves herein described comprising the casing having a valve-seat, and a branch outlet and main outlet beyond said seat and a valve proper fitted to the seat of the casing and having a projecting portion controlling the main outlet and adapted to open the same subsequent to the opening of the valve to permit the passage of pressure to the branch outlet substantially as set forth.

3. The combination of the casing having a valve-seat, a chamber at the outer side of said seat and having a branch port in communication with said chamber and a cylinder extending beyond said chamber and a valve fitted to the seat of the casing and having at its outer side a projecting cylindrical portion fitted to the cylinder of the valve and having a port or ports arranged for operation substantially as described.

4. A valve comprising a casing having a main outlet and a branch outlet, and a valve proper provided with means for controlling the main outlet and branch outlet and operating to open the main outlet subsequent to the opening of the branch outlet substantially as set forth.

5. The combination in a valve with the casing having a valve-seat, an annular chamber at the outer side of said seat and a cylindrical portion of less diameter than the annular chamber and extending thence toward a main outlet and provided with a branch outlet communicating with the annular chamber and the valve proper having at its outer side a projecting cylindrical portion fitted to the cylindrical portion of the casing and adapted to control the passage of pressure to the main outlet substantially as set forth.

6. In a valve a casing having a valve-seat, a branch outlet and a main outlet beyond the same, a valve proper fitted to the seat of the casing and controlling the passage of pressure to the branch outlet, said valve proper being provided with means controlling the passage of pressure to the main outlet and arranged to open the main outlet subsequent to the opening of the branch outlet substantially as set forth.

7. A valve substantially as herein described comprising the casing having a valve-seat and a valve fitted to said seat and having at its outer side a cylindrical extension imperforate adjacent to the valve and provided between said valve and its outer end with an opening or openings forming ports for the passage of pressure, the casing having a main outlet and a branch outlet substantially as and for the purposes set forth.

8. The valve herein described comprising the casing having a valve-seat and a valve fitted to said seat and having at its outer side a cylindrical extension imperforate adjacent to the valve and provided between said valve and its outer end with a tapered opening or openings forming ports for the passage of pressure, substantially as and for the purposes set forth.

9. The valve herein described, comprising the casing having a valve-seat and beyond the same a cylindrical portion and provided between the valve-seat and the cylindrical portion with a branch outlet, and the valve proper fitted to said seat and having at its outer side a cylindrical extension imperforate adjacent to the valve and provided between said valve and its outer end with a tapered opening forming a port for the passage of pressure, whereby the valve may be operated to permit the passage of pressure to the branch outlet in advance of the passage of pressure through the tapered opening to the main outlet, substantially as set forth.

HERBERT M. LOFTON.

Witnesses:
SOLON C. KEMON,
PERRY B. TURPIN.